3,637,623
POLYMERIZATION OF VINYL CHLORIDE IN
BULK AND AT LOW TEMPERATURES
Sergio Lo Monaco, Vicenza, Corrado Mazzolini, Mestre, and Luigi Patron and Alberto Moretti, Venice, Italy, assignors to Chatillon Società Anonima Italiana per le Fibre Tessili Artificiali S.p.A., Milan, Italy
No Drawing. Continuation-in-part of application Ser. No. 671,216, Sept. 28, 1967. This application Feb. 27, 1970, Ser. No. 15,217
Claims priority, application Italy, Sept. 19, 1969, 22,250/69
Int. Cl. C08f 1/04, 1/61, 3/30
U.S. Cl. 260—85.5           15 Claims

ABSTRACT OF THE DISCLOSURE

Vinyl chloride is polymerized in bulk and at low temperatures in the presence of a lower mercaptan utilizing a polymerization catalyst comprised of an organic hydroperoxide, sulphur dioxide and an alcoholate of a Group I metal of the Periodic Table, the molar ratio of the difference between the concentrations in moles of the said alcoholate and the $SO_2$ to the concentration in moles of the said hydroperoxide being greater than 0 but less than about 0.5.

CROSS REFERENCE TO RELATED APPLICATION

This application is a continuation-in-part of our copending application Ser. No. 671,216, filed Sept. 28, 1967.

In said copending application, Ser. No. 671,216, there is disclosed and claimed a process for bulk-polymerizing vinyl chloride at low temperatures (e.g., lower than 0° C.) in the presence of a catalytic system comprised of an organic hydroperoxide, sulphur dioxide and an alcoholate of a metal of the first or second group of the Periodic Table or aluminum, and wherein the molar ratio $(R-O)^-/SO_2$ (wherein R is a linear or branched chain alkyl radical having from 1 to 6 carbon atoms) does not exceed 2.

As described in the aforesaid copending application, the corresponding ratios and concentrations of the various components of the catalytic system preferred for the practice of the invention are:

(1) A concentration of organic hydroperoxide comprised from between 0.01 and 3% by weight with respect to the monomer;
(2) A concentration of sulphur dioxide varying with the concentration of the organic hydroperoxide in such manner that the molar ratio sulphur dioxide/organic hydroperoxide be comprised preferably from between 1:15 and 15:1.
(3) A concentration of alcoholates comprised from between 0.01% and 5% by weight with respect to the monomers.

A bulk polymerization conducted in the presence of the above specified catalytic systems, however, like any other bulk polymerization, as a practical matter, exhibits certain limits with regard to the maximum conversion attainable under conditions of fluidity of the reaction medium. Such limits are mainly due to the fact that the polymerization mass, during the polymerization itself, very rapidly acquires a thickened state due to the absorption of the monomer by the polymer. Steps have been taken toward the solution of this problem. For example, in Patron et al. copending application Ser. No. EHM–6133, filed Oct. 14, 1969, and assigned to the assignee herein, a process is disclosed for the continuous low-temperature bulk polymerization of vinyl chloride with conversions greater than 18%, in the presence of a catalyst system consisting either of (1) an organic hydroperoxide, sulphur dioxide and an alcoholate of a metal of the first or second group of the Periodic System or of aluminum or (2) an organic hydroperoxide activated by an alcoholic solution of sulphur dioxide and of at least one oxide or hydroxide of an alkaline metal or of magnesium or of magnesium sulphite, the improved features residing in:

(a) pre-charging the reactor with vinyl chloride to at least ⅓ of its useful holding capacity;
(b) starting the polymerization with one of the above-described catalysts until a degree of conversion of at least 10% is attained in the persence of a mercapto-compound having a maximum of 4 carbon atoms, which compound is fed to the reaction medium in a concentration of at least 1.3 times that provided in steady conditions of polymerization;
(c) maintaining during the starting phase of the polymerization a conversion increase below 2.5%/h. and a viscosity of the polymer obtained below 1.5 dl./g.; and
(d) carrying on the polymerization in a continuous way according to the predetermined formulation for the steady conditions, with a quantity of mercapto-compound of at least $1.5 \cdot 10^{-3}$ moles/kg. of monomer.

It has now been surprisingly found that especially high conversions, namely, conversions higher than 18%, and especially desirable polymers which exhibit excellent physiochemical properties, are attained when the polymerization of vinyl chloride in bulk, continuously, and at low temperature, is conducted in the presence of a catalytic system comprised of an organic hydroperoxide, sulphur dioxide and at least one alcoholate of a Group I metal of the Periodic Table, and in which the molar ratio:

that is, $$\frac{\text{Difference between the concentrations in moles of the alcoholate and the } SO_2}{\text{Concentration in moles of the hydroperoxide}}$$

is greater than 0 and less than about 0.5, and wherein R is a linear or branched chain alkyl radical having from 1 to 6 carbon atoms, where Me is a Group I metal, and wherein R' is a linear or branched chain alkyl radical, a cycloalkyl radical, and aryl radical or an aryl-alkyl radical, and in the further presence of at least about 0.005% up to bout 1% of a mercapto-compound having a maximum of 4 carbon atoms.

In the following Table I there are recorded polymerization conversions and intrinsic viscosity of the polymer obtained via the continuous bulk-polymerization, at −30° C., of vinyl chloride according to the process of this invention, by employing different values of the molar ratio

The intrinsic viscosity was determined in cyclohexanone at 30° C. The sodium methylate was fed by means of two methanolic solutions, one of which containing $SO_2$ and an equimolar amount with respect to $SO_2$, of sodium methylate, and the other containing the remaining methylate. The contact time of the reactants with each other was 8 hours.

The polymerization was started by pre-charging a 2-liter reactor with 1000 g. of vinyl chloride and 0.2 g. of 2-mercaptoethanol. There was next commenced feeding of the monomer and of the components of the catalytic system in those amounts reflected in the said Table I.

the reaction mass either as such or in solution in a suitable solvent such as methyl, ethyl, and propyl alcohol, etc.

The concentration of the sulphur dioxide is also not critical, though it is preferred to maintain said concentration below 3% by weight with respect to the monomers.

Concentration of sulphur dioxide greater than 3% may just as well be used, but some are not advisable in practice as they do not involve any appreciable increase in the polymerization speed but only cause a greater consumption.

Concentrations of sulphur dioxide comprised between 0.01% and 2% by weight are particularly preferred.

TABLE I

| Concentration of cumene hydroperoxide [1] | Concentration of $SO_2$ [1] | 2-mercapto-ethanol [2] | Concentration of sodium methylate [2] | $\dfrac{[\text{R—O—Me}]\text{-}[SO^2]}{[\text{R'—OO—H}]}$ | Conversion in percent | Intrincis viscosity in dl./g.[3] | Speed of dehydro-chlorination in moles of HCl/g./h. at 180° C.[4] |
|---|---|---|---|---|---|---|---|
| 0.08 | 0.05050 | 0.035 | 0.0142 | −1    | 6.5  | 0.50 | 400.10⁻⁶ |
| 0.08 | 0.05050 | 0.035 | 0.0284 | −0.5  | 13.2 | 0.95 | 370.10⁻⁶ |
| 0.08 | 0.05050 | 0.035 | 0.0426 | 0     | 17.5 | 1.05 | 150.10⁻⁶ |
| 0.08 | 0.05050 | 0.035 | 0.0454 | 0.1   | 18.9 | 1.20 | 35.10⁻⁶ |
| 0.08 | 0.05050 | 0.035 | 0.0482 | 0.2   | 19.7 | 1.25 | 33.10⁻⁶ |
| 0.08 | 0.05050 | 0.035 | 0.0568 | 0.5   | 18.8 | 1.45 | 35.10⁻⁶ |
| 0.08 | 0.05050 | 0.035 | 0.0625 | 0.7   | (5)  |  |  |
| 0.08 | 0.05050 | 0.035 | 0.0710 | 1     | (6)  |  |  |

[1] Percent by weight with respect to the monomer.
[2] Percent with respect to the monomer.
[3] The intrinsic viscosity was determined in cyclohexanone at 30° C.
[4] The dehydrochlorination speed was determined according to the procedure described in: W. C. Geddes, Europ. Polym Jour., vol. 3, p. 267 (1967).
[5] Thickening after 8 hours from start.
[6] Thickening after 6 hours from start.

Amongst the alcoholates of the metals of the first group of the Periodic Table those having a number of carbon atoms comprised between 1 and 3 are the preferred for reasons of solubility. The alcoholates obtained through the direct reaction of alcohol with metal are especially preferred for reasons of economy and ease of preparation, and of these sodium or potassium methylate or ethylate are the most preferred.

The alcoholates may be added to the reaction mass either as such or, better still, dissolved in a non-reactive organic solvent. The optimum solvents for alcoholates are aliphatic alcohols having from 1 to 5 carbon atoms, and, of these, methyl and ethyl alcohols are the preferred.

Practically, it is advantageous to feed the amount of alcoholate contemplated by means of two separate alcoholic solutions, one of which containing the quantity of $SO_2$ contemplated and an equimolecular quantity of alcoholate, and the other solution containing the remaining alcoholate.

By organic hydroperoxide there are intended those organic compounds of the general formula R'—O—O—H, wherein R' may be a linear or branched chain alkyl radical, a cycloalkyl radical, an aryl radical or an aryl-alkyl radical.

Examples of such hydroperoxides which may be conveniently used in the process of this invention are methyl-, ethyl-, n-propyl-, iso-propyl-, tert. butyl-, n-butyl, iso-butyl-, amyl-, hexyl-, octyl- ecc. hydroperoxide; di-iso-propyl-benzene-hydroperoxide; phenyl-ethyl hydroperoxide; phenyl - isobutyl - hydroperoxide; phenyl-isopropyl-hydroperoxide; 1 hydroxyethyl - hydroperoxide; methyl-ethyl - ketone hydroperoxide; α-α-di-methyl-benzyl-hydroperoxide; p - isopropyl - α-α-di-methyl-benzyl-hydroperoxide; p.menthane hydroperoxide. Particularly advantageous results are attained by using cumenehydroperoxide or tertiary-butyl-hydroperoxide.

The concentration of the organic hydroperoxide is not critical and, in general, may vary from about 0.01% to 3% by weight with respect to the monomers, although concentrations of hydroperoxide not exceeding 0.4% are preferred. The organic hydroperoxide may be fed to The mercapto-compounds having a maximum of 4 carbon atoms and which may be used in this invention are, for instance: n-butyl-mercaptan, n-propyl-mercaptan, 2-mercapto-ethanol, 1,2 - ethane-di-thiole, 3-mercapto-propanol, α-mercapto-acetic acid, methyl α-mercapto-acetate or ethyl α-mercapto-acetate, α-thio-glycerine, and the like.

Of the mercapto-compounds having a maximum of 4 carbon atoms, those having a boiling point greater than 100° C. are the preferred, in practice, especially in the case where it is desired to carry out the cooling of the reaction mass through the evaporation of the monomer within the reactor.

By "low temperature" there is intended a temperature below 0° C., and, more particularly, a temperature comprised between −10° and −70° C. This temperature of the reaction mixture is controlled through conventional means such as, for instance, the immersion of the reactor in a cryostatic bath or by circulating a cooling fluid around the reactor walls or through coils provided inside the reactor, or else by conducting the polymerization such that there is dispersion of the reaction heat through evaporation of the monomer.

By "bulk polymerization" as used herein there is intended not only the polymerization carried out by the catalytic system in the undiluted monomer, but also that polymerization conducted in the presence of minor quantities of non-reactive organic compounds, which compounds are liquid at polymerization temperatures and which exert a fluidizing action on the polymerization slurry to render the same more stirrable and to facilitate heat exchange throughout the polymerization vessel.

As fluidizing reactants the following substances may be employed: aliphatic hydrocarbons, aryl-hydrocarbons, cycloalkyl-hydrocarbons, saturated halogenated hydrocarbons, and the like.

At the outlet of the reactor, the polymerization mass may be treated with an aqueous or alcoholic solution containing a polymerization-inhibiting agent such as, for instance, a hydroxylamine salt, or it may be centrifuged at a temperature about equal to that of the polymerization.

It is moreover advisable to conduct the polymerization in the absence of oxygen which has an inhibiting effect on the polymerization. In general, for this purpose, for displacing the air from the reactor, there are used suitable inert gases, such as nitrogen.

It is to be understood that the catalytic systems employed in the process of the present invention may also advantageously be applied in the preparation of vinyl chloride copolymers containing up to 50% by weight of at least one other ethylenically unsaturated monomer copolymerizable with vinyl chloride. The only difference with respect to the above described process is that the starting monomers are a mixture of vinyl chloride and one or more ethylenically unsaturated monomers copolymerizable with the said vinyl chloride.

By the term "ethylenically unsaturated monomers" there are intended organic compounds containing the C=C group. Examples of such compounds are: vinyl or vinylidene compounds, such as vinylidene fluoride or chloride; vinyl fluoride; vinyl esters of aliphatic carboxylic acids containing from 2 to 18 carbon atoms, such as, for instance, the vinyl esters of acetic acid, of the propionic acid, etc.; monomers of the acrylic type such as acrylic acid, methacrylic acid and their derivatives, such as acrylonitrile, acrylates and methacrylates of aliphatic alcohols containing from 1 to 12 carbon atoms, and the like.

In order to further illustrate the present invention and the advantages thereof, the following specific examples are given, it being understood that same are intended merely as illustrative and in no wise limitative.

EXAMPLE 1

A polymerization reactor with a holding capacity of 2000 liters, provided with a stirrer and an overflow pipe, and insulated against thermal dispersions, was repeatedly purged of air with nitrogen.

Into this reactor were then continuously fed:
200 kg./hr. of liquid vinyl chloride at −30° C.,
240 g./hr. of cumene hydroperoxide,
150 g./hr. of sulphur dioxide,
136 g./hr. of sodium methylate and
60 g./hr. of 2-mercapto-ethanol.

The sodium methylate was fed in two methanolic solutions, one of which contained the sulphur dioxide and an equimolar amount of sodium methylate while the other contained the remaining methylate.

The molar ratio $$\frac{[\text{sodium methylate}] - [\text{SO}_2]}{[\text{cumene hydroperoxide}]}$$

equalled 0.1.

The inside reactor pressure was maintained at a pressure of 365 mm. Hg, corresponding to the vapor pressure of vinyl chloride at −30° C. In this way the monomer itself, via evaporation, substracted the polymerization heat. The evaporated monomer was condensed by means of a reflux-cooler which returned the monomer to the polymerization reactor. Through the overflow pipe, the polymeric suspension obtained was discharged into a container maintained at −30° C.

Thereafter the polymeric suspension was centrifuged at −30° C. and from the polymer thus obtained the residual monomer was removed in a plate furnace heated to 60° C., while the evaporated monomer was condensed and re-cycled back into the reactor.

The monomer separated by centrifugation was then distilled and re-cycled into the polymerization reactor after a previous cooling at −30° C. through a heat exchanger.

Thereby were obtained 45 kg./hr. (conversion 22.5%) of polyvinyl chloride which exhibited the following properties:

Intrinsic viscosity=1.30 dl./g.
Dehydrochlorination at 180° C.=36.10$^{-6}$ moles of HCl/g./hr.

EXAMPLE 2

The procedure of Example 1 was repeated, but with there being continuously fed:
133 kg./hr. of vinyl chloride,
199 g./hr. of cumene hydroperoxide,
125 g./hr. of sulphur dioxide,
134 g./hr. of sodium methylate and
95 g./hr. of 2-mercapto-ethanol.

Thereby were obtained 36.2 kg./hr. (conversion 27.2%) of polyvinyl chloride which exhibited the following properties:

Intrinsic viscosity=1.38 dl./g.
Dehydrochlorination at 180° C.=34.10$^{-6}$ moles of HCl/g./hr.

What is claimed is:
1. In a continuous process for the low-temperature bulk polymerization of vinyl chloride at a temperature below 0° C. utilizing a polymerization catalyst consisting essentially of a small but catalytically effective amount of each of an organic hydroperoxide, sulphur dioxide, and an alcoholate of a Group I metal of the Periodic Table, said alcoholate having from 1 to 6 carbon atoms, the improvements which comprise: (a) employing the components of the catalyst in amounts such that the molar ratio of the difference between the concentrations in moles of the said alcoholate and the SO$_2$ to the concentration in moles of the said hydroperoxide is greater than 0 but less than about 0.5; and (b) conducting the polymerization in the presence of a mercaptan having a maximum of four carbon atoms and employed in a concentration of at least 0.005% by weight based on the monomer.

2. The process as defined by claim 1, wherein the concentration of the mercaptan ranges from between about 0.005 and 1% by weight based on weight monomer.

3. The process as defined by claim 2, wherein the alcoholate has from 1 to 3 carbon atoms.

4. The process as defined by claim 3, wherein the alcoholate is selected from the group consisting of sodium methylate and sodium ethylate.

5. The process as defined by claim 3, wherein the alcoholate is selected from the group consisting of potassium methylate and potassium ethylate.

6. The process as defined by claim 2, wherein the alcoholate is introduced to the reaction mass as a solution in an aliphatic alcohol having from 1 to 5 carbon atoms.

7. The process as defined by claim 2, wherein the alcoholate is introduced to the reaction mass as two separate solutions in an aliphatic alcohol having from 1 to 5 carbon atoms, the first containing the amount of sulphur dioxide intended and an equimolar amount of alcoholate, and the second containing the remaining alcoholate.

8. The process as defined by claim 2, wherein the concentration of the organic hydroperoxide ranges from between about 0.01 and 3% by weight based on weight monomer.

9. The process as defined by claim 2, wherein the concentration of the sulphur dioxide does not exceed 3% by weight based on weight monomer.

10. The process as defined by claim 2, wherein the vinyl chloride is copolymerized with up to 50% of at least one other ethylenically unsaturated monomer copolymerizable therewith.

11. The process as defined by claim 8, wherein the concentration of the organic hydroperoxide does not exceed 0.4% by weight based on weight monomer.

12. The process as defined by claim 9, wherein the concentration of the sulphur dioxide ranges from between about 0.01 and 2% by weight based on weight monomer.

13. The process as defined by claim 6, wherein the aliphatic alcohol solvent is selected from the group consisting of methyl alcohol and ethyl alcohol.

14. The process as defined by claim 2, wherein the mercaptan has a boiling point of greater than 100° C.

15. The process as defined by claim 14, wherein the mercaptan is selected from the group consisting of n-butyl-mercaptan, and n-propyl-mercaptan, 2-mercapto-ethanol, 1,2-ethane-di-thiole, 3-mercapto-propanol, α-mercapto-acetic acid, methyl-α-mercapto-acetate, ethyl-α-mercapto-acetate, and α-thio-glycerine.

References Cited

UNITED STATES PATENTS 3,255,164   3/1966   Visger et al. _____ 260—86.3

JOSEPH L. SCHOFER, Primary Examiner

J. A. DONAHUE, Assistant Examiner

U.S. Cl. X.R.

260—86.3, 87.1, 87.5 A, 87.8, 92.8